(12) United States Patent
Westroos et al.

(10) Patent No.: US 8,346,242 B2
(45) Date of Patent: Jan. 1, 2013

(54) TELECOMMUNICATIONS SYSTEM AND METHOD

(75) Inventors: Anders Westroos, Brokind (SE); Fredrik Hillström, Linköping (SE); Peter Ostrup, Linköping (SE); Stefan Johansson, Linköping (SE); Walter Müller, Upplands Väsby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 114 days.

(21) Appl. No.: 13/121,676

(22) PCT Filed: Oct. 8, 2008

(86) PCT No.: PCT/SE2008/051148
§ 371 (c)(1),
(2), (4) Date: Mar. 29, 2011

(87) PCT Pub. No.: WO2010/041994
PCT Pub. Date: Apr. 15, 2010

(65) Prior Publication Data
US 2011/0177820 A1    Jul. 21, 2011

(51) Int. Cl.
*H04W 4/00* (2009.01)
(52) U.S. Cl. .................. 455/422.1; 455/432.1; 455/436; 455/438; 455/439; 455/440; 455/67.11
(58) Field of Classification Search .......... 455/436–444, 455/422.1, 67.11, 432.1; 370/320, 328, 329, 370/330
See application file for complete search history.

(56) References Cited

U.S. PATENT DOCUMENTS

| | | | | |
|---|---|---|---|---|
| 8,000,705 B2 * | 8/2011 | Kim et al. | | 455/435.1 |
| 8,095,075 B2 * | 1/2012 | Vadlamudi | | 455/67.11 |
| 2006/0223493 A1 | 10/2006 | Freund | | |
| 2009/0116385 A1 * | 5/2009 | Ueda | | 370/230 |

OTHER PUBLICATIONS

European Office Action—EP Application No. 08 877 320.5—2412; May 14, 2012 (6 pages).
International Preliminary Report on Patentability with Written Opinion of the International Searching Authority, PCT Application No. PCT/SE2008/051148, Apr. 21, 2011.
International Search Report, PCT/SE2008/051148, Jun. 29, 2009.
Huawei, "Specific cause value for X2 handover preparation failure", 3GGP TSG RAN WG3 Meeting #60, R3-081158, Kansas City, USA, May 5-9, 2008, 2 pp.
Huawei, "UE Redistribution in case of catastrophic failure in MME/UPE", 3GPP TSG SA WG2 Architecture—S2#55, S2-063675, Busan, South Korean, Oct. 23-27, 9 pp.
Nokia Siemens Networks "Update on Security, SU-1, Mobility, MBMS . . .", 3GGP TSG-RAN2 Meeting #59, R2-073054, Athens, Greece, Jun. 20-24, 2007, 92 pp.

* cited by examiner

*Primary Examiner* — Olumide T Ajibade Akonai
(74) *Attorney, Agent, or Firm* — Myers Bigel Sibley & Sajovec, P.A.

(57) ABSTRACT

The present invention overcomes the problem of S1 interface failure by redirecting user equipments to another radio basestation, or another RAT. This redirecting may be on a UE-by-UE basis, i.e. when a connection request is received, redirecting that UE, or may involve redirecting all UEs in a cell by broadcasting modified system information. The redirecting may be such that future traffic load, for example as caused by UEs performing tracking area updates, is minimized, by instructing UEs to redirect after a randomized period of time, or by locking the cell after a randomized period of time, for example. In yet further embodiments of the invention, the cell may be locked after a certain number of connection requests have been received. In this way, particularly busy cells can be locked sooner than would otherwise be the case.

20 Claims, 5 Drawing Sheets

TELECOMMUNICATIONS SYSTEM AND METHOD

CROSS REFERENCE TO RELATED APPLICATION

This application is a 35 U.S.C. §371 national stage application of PCT International Application No. PCT/SE2008/051148, filed on 8 Oct. 2008, the disclosure and content of which is incorporated by reference herein in its entirety. The above-referenced PCT International Application was published in the English language as International Publication No. WO 2010/041994 A1 on 15 Apr. 2010.

FIELD OF THE INVENTION

The invention relates to a telecommunications system and method, and in particular to a telecommunications system and method for handling connection establishment requests following a network interface failure.

BACKGROUND OF THE INVENTION

As is generally known, telecommunications systems employ a cellular system in which a plurality of radio basestations each maintain one or more "cells" to which user equipments (also known as mobile terminals) are connected. The radio basestations send communications (e.g. control and data signals) to the UEs in the downlink, and receive communications from the UEs in the uplink. The radio basestations further communicate with a core network, which maintains overall control of the telecommunications system. In different telecommunications systems, functionality is split differently between the radio network (i.e. the radio basestations and the mobile terminals, etc) and the core network.

Figure 1:
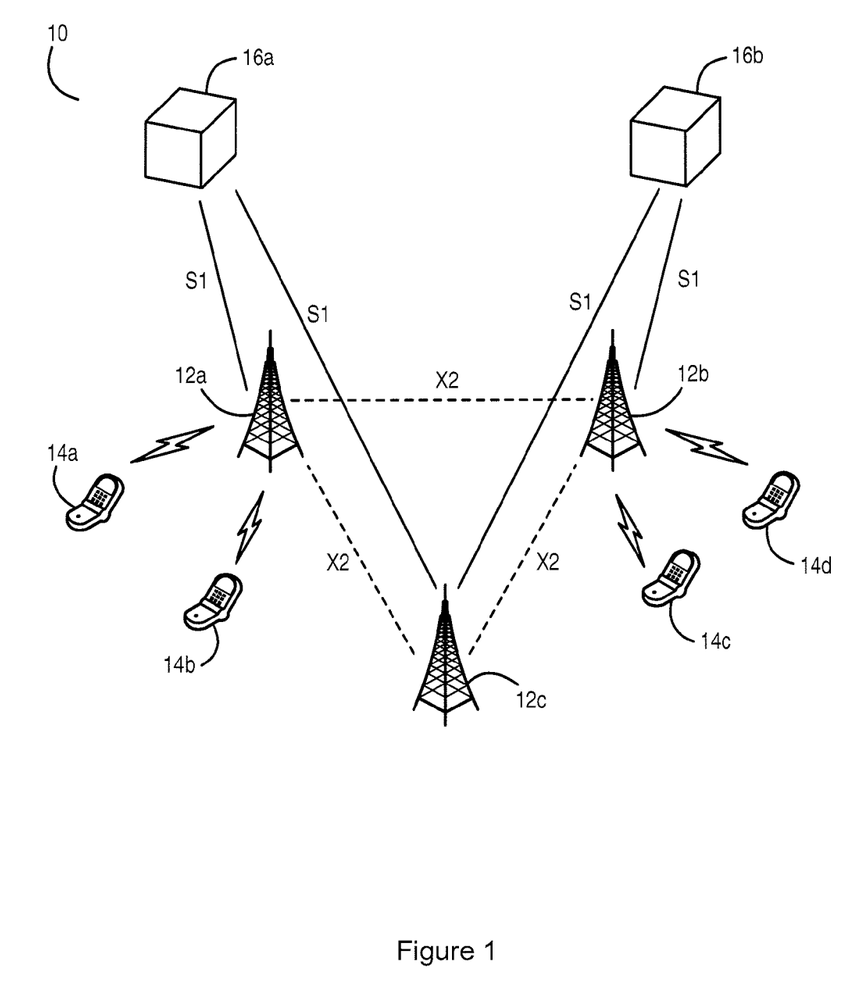
FIG. 1 shows an example of a telecommunications network.

FIG. 1 shows an exemplary telecommunications system 10, known as the E-UTRAN (Evolved UMTS terrestrial radio access network) which uses the Long Term Evolution (LTE) standard. The system 10 comprises a plurality of radio basestations (also known as eNode Bs, Node Bs, etc) 12a, 12b, 12c, each of which maintains one or more cells (not illustrated). UEs 14a, 14b, 14c, 14d within each cell communicate with the corresponding radio basestation 12 of that cell. Also, as is known, cells are grouped together into what are known as "tracking areas".

In the E-UTRAN, radio basestations are capable of communicating with one another over interfaces known as X2 interfaces (illustrated as dashed lines in FIG. 1). Each radio basestation 12 further has one or more interfaces with the core network. These are known as S1 interfaces (illustrated as solid lines in FIG. 1). In particular, the radio basestations 12 have one or more S1 interfaces to one or more mobility management entities (MMES) 16a, 16b, as will be described in more detail below.

The cells of a radio basestation can be connected to different sets of MMEs (i.e. different MME Pools), through use of the tracking area. One MME pool is responsible for a certain tracking area, and a cell is connected to a certain tracking area. In FIG. 1, all of the cells of the radio basestations are connected to the same MME Pool (i.e. MMEs 16a and 16b). However, different cells, of the same radio basestation, may be connected to different tracking areas that are in turn connected to different MME pools.

A UE generally selects its cell by determining the strongest received signal and, once selected, the UE reads system information through that cell. The system information contains, amongst other things, the tracking area of which the cell is part.

Once the UE selects a cell, it also performs a tracking area update towards the core network (e.g. the MME) to let the core network know in which tracking area it is located, and to receive a tracking area list of the cells in which, should the UE move to any of them, the UE need not perform a tracking area update.

Thus, it can be seen that a relatively high amount of traffic may be generated to and from the core network when a UE moves between cells.

A further problem arises when all of the S1 interfaces of a particular radio basestation have become non-operational. A proposed solution to this problem has been to "lock" the cell, i.e. to effectively turn off the output power of the radio basestation, and thus to stop broadcasting the system information. However, this solution itself causes problems. For example, a user in idle mode that would not be able to re-select to another, functional cell will become aware that the network has developed a fault, in that his or her UE will indicate that there is no network. Furthermore, if an S1 interface becomes non-operational, it will most probably be affecting many radio basestations at the same time. This implies that many UEs will attempt cell-reselection, with some or all of them performing a subsequent tracking area update, at the same time. This could potentially lead to failure in other nodes that become inundated with connection requests, etc, causing the problem to spread to other parts of the network.

SUMMARY OF THE INVENTION

According to a first aspect of the invention there is provided a radio basestation for serving one or more cells of a telecommunications network, the telecommunications network comprising a core network and a radio access network. The radio basestation comprises one or more interface means for linking the radio basestation with the core network; and means for redirecting user equipments to another radio basestation or another radio access technology (RAT) when each of said one or more interface means is non-operational.

Thus, the present invention overcomes the problem of S1 interface failure by redirecting user equipments to another radio basestation, or another RAT. This redirecting may be on a UE-by-UE basis, i.e. when a connection request is received, redirecting that UE, or may involve redirecting all UEs in a cell by broadcasting modified system information.

According to further embodiments of the invention, the redirecting may be such that future traffic load, for example as caused by UEs performing tracking area updates, is minimized. This may be achieved by instructing UEs to redirect after a randomized period of time, or by locking the cell after a randomized period of time, for example.

In yet further embodiments of the invention, the cell may be locked after a certain number of connection requests have been received. In this way, particularly busy cells can be locked sooner than would otherwise be the case.

BRIEF DESCRIPTION OF THE DRAWINGS

For a better understanding of the present invention, and to show more clearly how it may be carried into effect, reference will now be made, by way of example only, to the following drawings in which.

DETAILED DESCRIPTION

The present invention is generally applicable to telecommunications networks of the type illustrated in FIG. 1. In particular, the invention is applicable to any telecommunications system having radio basestations, wherein those radio basestations each have one or more interfaces to a core network. Accordingly, the invention is relevant for Long Term Evolution (LTE) and the E-UTRAN, but also to other standards and networks, including but not limited to GSM, UMTS, etc. For consistency, the invention will further be described with relevance to LTE and the E-UTRAN; however, as mentioned above, other systems and standards are also considered to fall within the scope of the invention.

Figure 2:
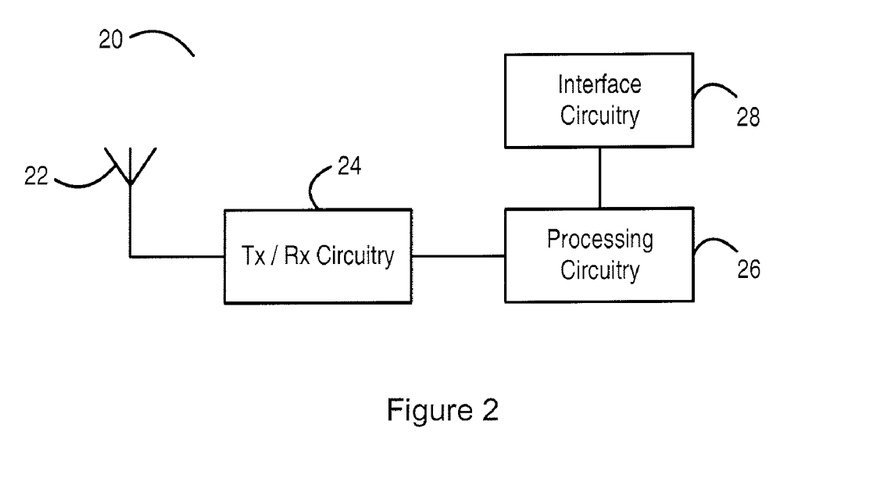
FIG. 2 shows a radio basestation according to the present invention.

FIG. 2 illustrates a radio basestation 20 according to the present invention. The radio basestation 20 comprises an antenna 22, which is capable of receiving and transmitting signals. The antenna 22 is coupled to transmitter/receiver circuitry 24 (or, more generally, transceiver circuitry), and this is in turn connected to processing circuitry 26.

The radio basestation 20 further comprises interface circuitry 28 for managing the one or more interfaces with the core network (e.g. S1 interfaces) and, if applicable, with other radio basestations (e.g. X2 interfaces).

Figure 3:
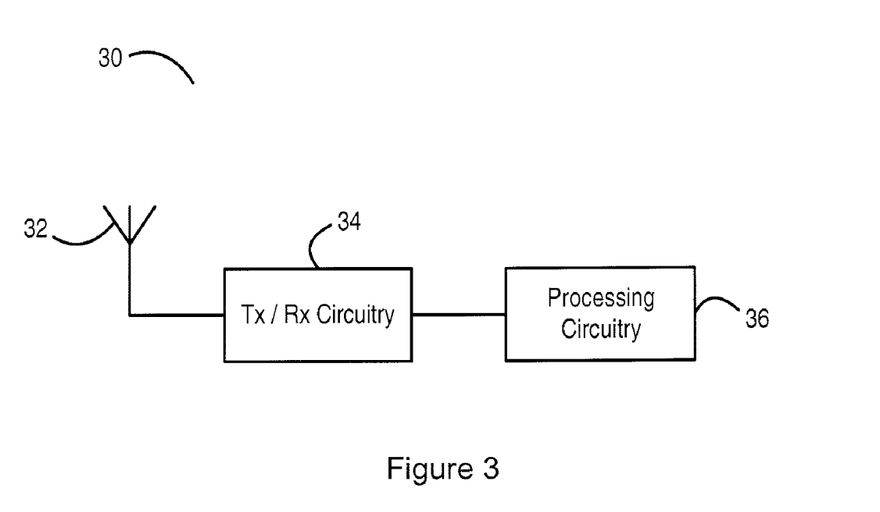
FIG. 3 shows a user equipment according to the present invention.

FIG. 3 illustrates a user equipment (or mobile terminal, etc) 30 according to the present invention. The UE 30 comprises an antenna 32, which is capable of receiving and transmitting signals. The antenna 32 is coupled to transmitter/receiver circuitry 34 (or, more generally, transceiver circuitry), and this is in turn connected to processing circuitry 36.

It will be apparent to those skilled in the art that, where they are non-essential for describing operations and processes according to the present invention, many features have been omitted from FIGS. 2 and 3 for clarity purposes.

According to the present invention, the cell is kept open, at least for a determined amount of time, after all S1 interfaces are non-operational. During the period of time in which the S1 interfaces are down, but the cell itself is operational, the radio basestation redirects UEs to a cell maintained by another radio basestation, or to another radio access technology (RAT) in which the interfaces with the core network are operational.

According to one embodiment of the present invention, to be described in greater detail below, UEs are redirected towards another basestation or RAT by means of a redirection message that is issued in response to a connection request by that UE. According to another embodiment, to be described in greater detail below, idle-mode UEs are redirected towards another basestation or RAT by means of the system information broadcast from the basestation.

Figure 4:
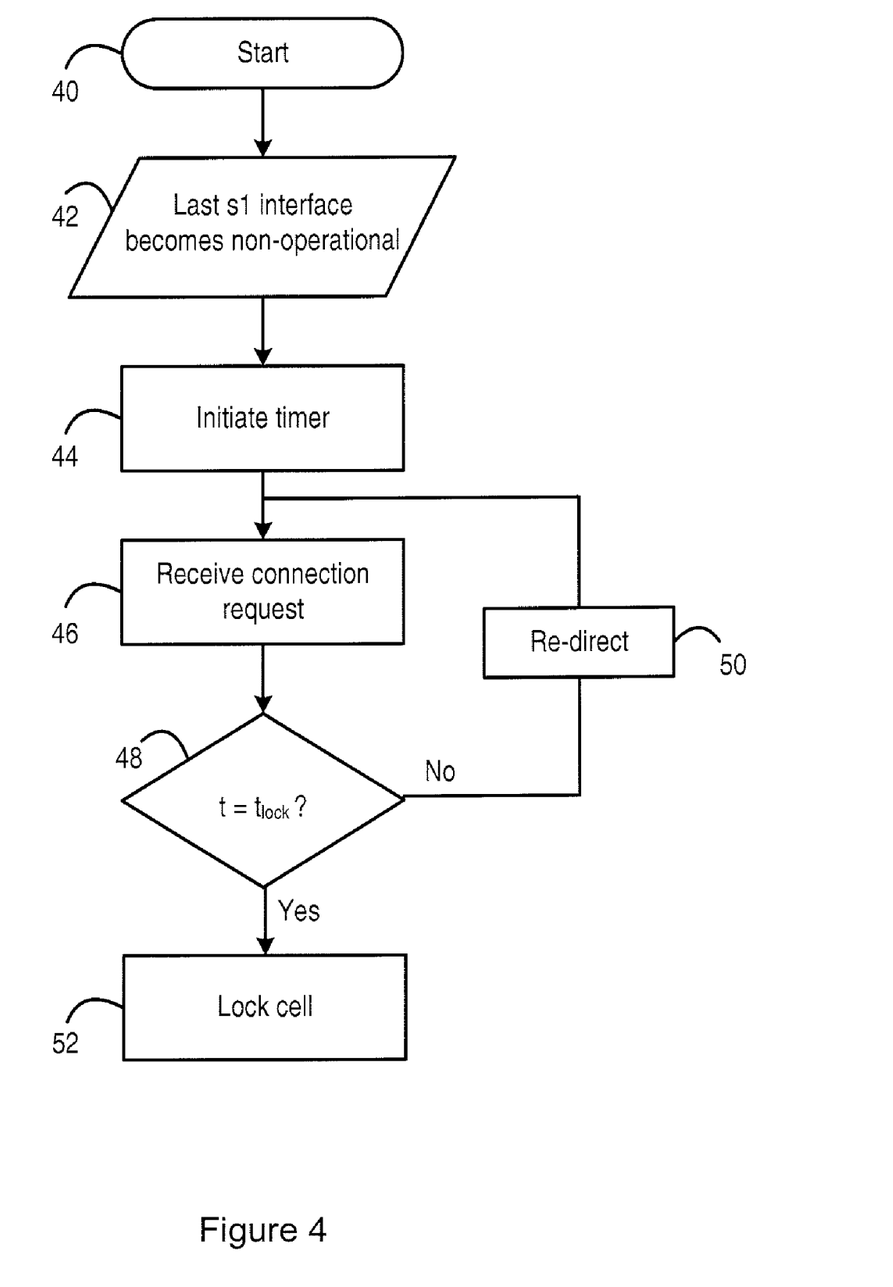
FIG. 4 is a flow chart of a first method according to the present invention.

FIG. 4 is a flow chart illustrating a method in a basestation of a telecommunications network in accordance with an aspect of the present invention.

The method starts in step 40, and then, in step 42, the last S1 interface between the basestation and the core network becomes non-operational. In step 44, a timer is initiated in the basestation, which determines the time $t_{lock}$ before the cell becomes locked. In one embodiment, the timer is initiated with a random value, which may be a random value within predefined limits (e.g. a random value between 30 and 120 seconds). In this way, if multiple basestations lose their S1 interfaces at the same time (as is quite likely if a MME become non-operational, for example), the basestations do not all lock at the same time. Thus any traffic associated with tracking area updates, etc, when a cell locks, is spread out over time.

Therefore, in another embodiment, the timer may be initiated according to one value within a predetermined pattern. That is, different basestations may have different preset timer values that ensure that, if a plurality of basestations all lose their S1 interfaces at the same time, cells are locked at different times thereafter.

Thus, in step 46, while the S1 interfaces are all non-operational, the basestation receives a connection request from a UE. In one embodiment, the connection request is an RRC Connection Request message from the UE to establish an RRC (Radio Resource Control) connection with the radio access network (i.e. the radio basestation). The UE can use the RRC connection to signal to the core network. The core network signalling may be just that—signalling (e.g. Tracking Area Update)—or it may be a request to setup one or more bearers to be used for userplane transfer (e.g. Internet browsing or Voice over IP service. In that case, the core network will request the setup of the bearers in the radio basestation. In step 48, it is determined whether the timer has reached $t_{lock}$ and, if not, the UE making the connection request is redirected to another radio basestation or to another radio access technology in step 50. In one embodiment, the UE is redirected with a standardized message. In order to achieve compatibility with legacy standards, a known standardized message may be adapted to include a redirection instruction, for example, the RRC ESTABLISHMENT REQUEST REJECT message.

The redirection message may include information to help the UE redirect to a specific RAT or basestation, such as a list of RATs or a list of cells to which the UE can redirect.

If it is determined in step 48 that the timer has reached $t_{lock}$, the cell is locked in step 52, i.e. the radio basestation is powered down and no new connection requests are processed.

Thus, according to this method, a cell stays open for a certain period of time after its last S1 interface becomes non-operational. During this time, any connection requests that are received are redirected to another radio basestation, or to another RAT.

Figure 5:
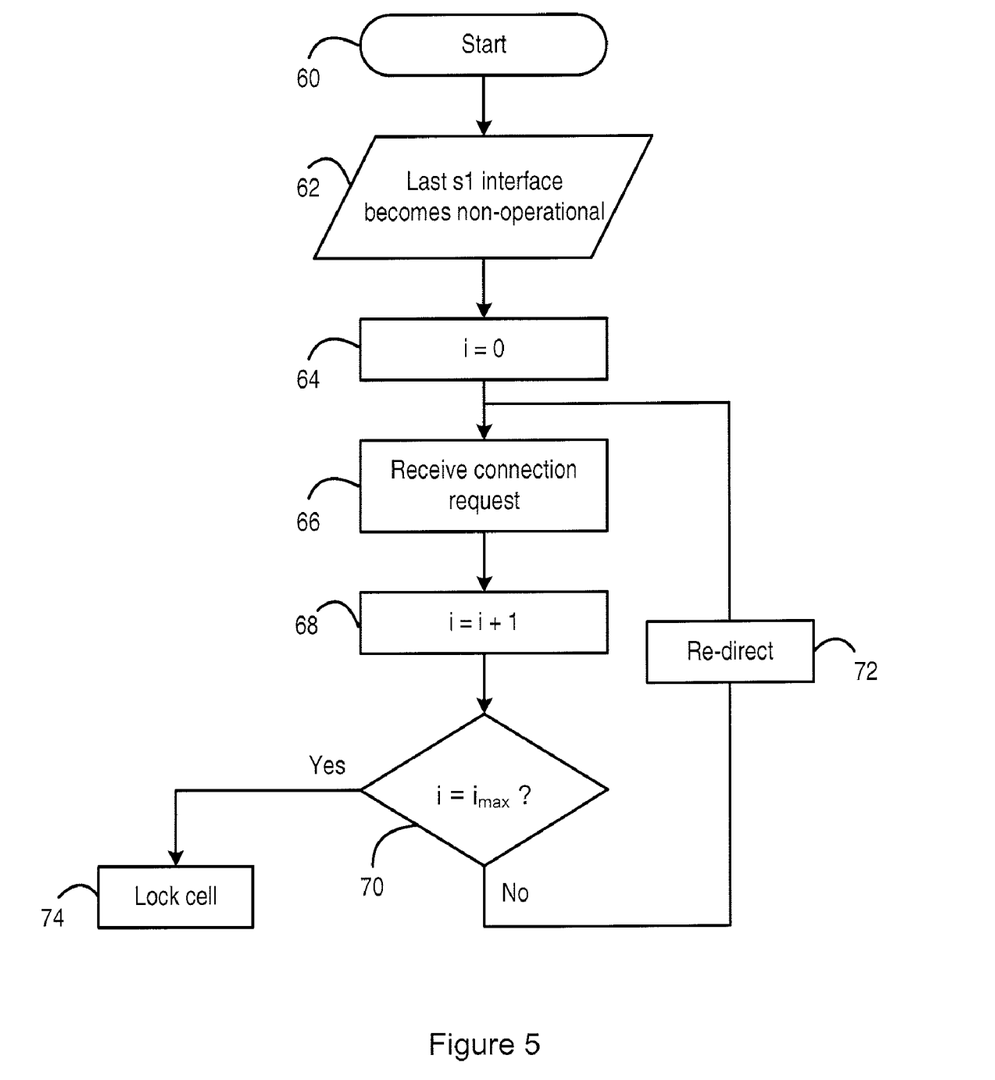
FIG. 5 is a flow chart of a second method according to the present invention.

FIG. 5 is a flow chart illustrating another method in a radio basestation according to the present invention.

The method starts in step 60, and then, in step 62, the last S1 interface between the basestation and the core network becomes non-operational. In step 64, a counter "i" is set to zero, and in step 66 a connection request is received from a UE. In response to receiving a connection request, in step 68 the counter i is stepped by 1, and in step 70 it is determined whether the value in the counter i has reached a predetermined threshold $i_{max}$. If the threshold has not been reached, the UE is redirected substantially as described above with reference to step 50 of the preceding method, and the process moves back to step 66. If $i_{max}$ has been reached, the cell is locked in step 74.

Thus, in this embodiment, the number of connection requests received whilst the S1 interfaces are non-operational, but before the cell has locked, is counted. Once the number of connection requests reaches a predetermined threshold, the cell is locked. In this way, particularly busy cells can be locked in a shorter period of time, thus increasing user satisfaction of the telecommunication network.

It will be apparent that the methods described with respect to FIGS. 4 and 5 are not mutually exclusive, and indeed may beneficially operate at the same time. Thus, in one embodiment, when the last S1 interface for a cell becomes non-operational, both a timer and a counter are initiated. Thus, the timer ensures that the cell will be become locked after a certain amount of time; however, particularly busy cells may reach their count threshold $i_{max}$ before the timer has reached $t_{lock}$, and therefore the cell may advantageously be locked more quickly in that case.

Figure 6:
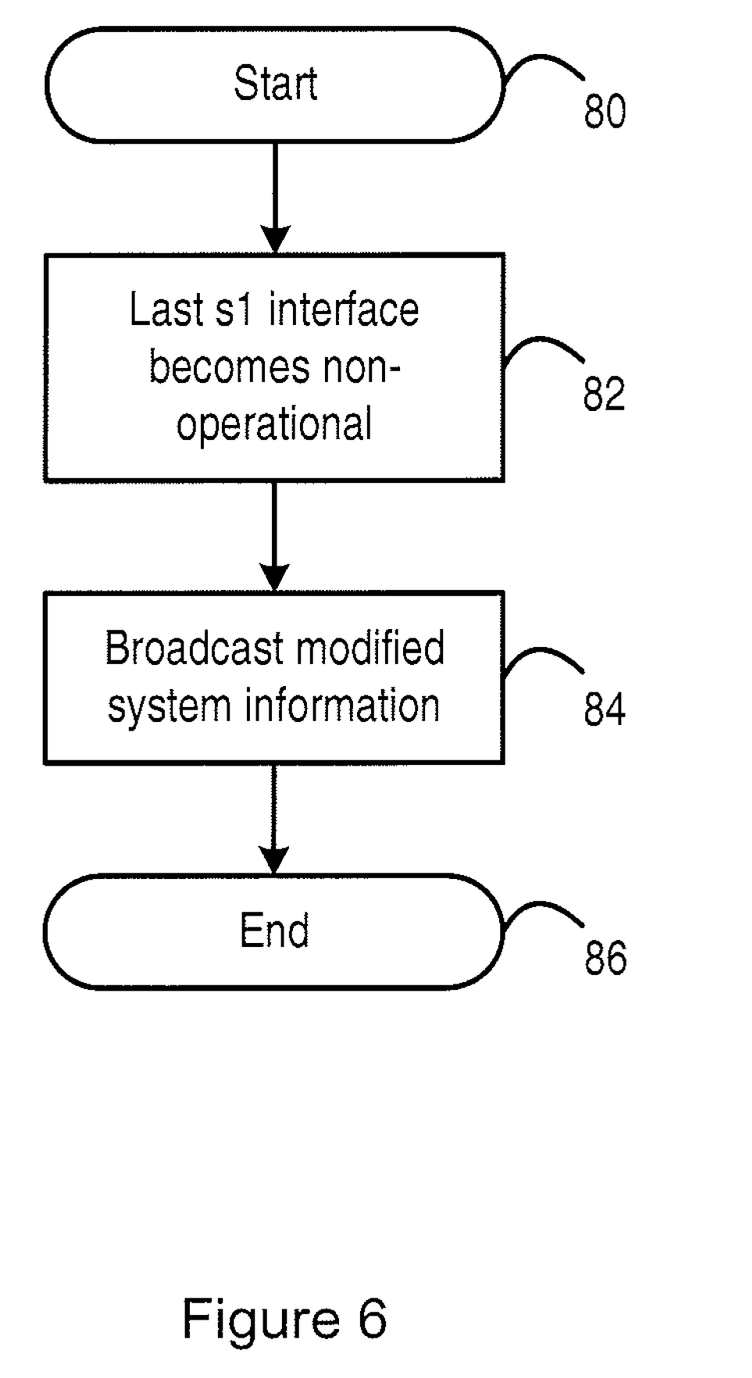
FIG. 6 is a flow chart of a third method according to the present invention.

FIG. 6 is a flow chart showing a method in a basestation according to a yet further aspect of the present invention.

The method starts in step 80, and then, in step 82, the last S1 interface between the basestation and the core network becomes non-operational. In step 84, a modified system information is broadcast throughout the cell, and in step 86, the method ends.

Conventional system information includes information on frequency bands, scheduling information, and other important information that will be known to those skilled in the art. According to an embodiment of the present invention, the system information is modified when the last S1 interface becomes non-operational to include redirection information that instructs idle-mode UEs to redirect to another radio basestation, or to another radio access technology (RAT).

In one embodiment, UEs may be instructed to redirect in a random time within a specified range. For example, the specified range may be hardcoded within a standard, or within the UE itself, or the range may be communicated within the system information. In this way the UEs do not all redirect at the same time, and the load on the system is spread out over a period of time.

When redirecting to another RAT, it may be advantageous to redirect UEs to a specific RAT with which there are no problems identified. For example, an operator employing LTE may use another 2G or 3G operator as overlay, and these may be more robust in the event of an interface failure.

Again, the method described with respect to FIG. 6 may be employed in any combination with those described with respect to FIGS. 4 and 5.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A radio basestation for serving one or more cells of a telecommunications network, the telecommunications network comprising a core network and a radio access network, the radio basestation comprising:
   one or more interface circuits configured for linking the radio basestation with the core network;
   circuitry configured for redirecting user equipments to another radio basestation or another radio access technology (RAT) in response to each of said one or more interface circuits becoming non-operational;
   circuitry configured for receiving a connection establishment request from a user equipment, wherein said circuitry configured for redirecting is further configured for redirecting said user equipment to another radio basestation or radio access technology upon receipt of said connection establishment request; and
   counting circuitry configured for counting a number of connection establishment requests received when each of said one or more interface circuits is non-operational.

2. A radio basestation as claimed in claim 1, wherein said circuitry configured for redirecting user equipments to another radio basestation is further configured for redirecting user equipments to a cell of another radio basestation.

3. A radio basestation as claimed in claim 1, wherein said circuitry configured for redirecting is further configured for sending an adapted RRC Connection Reject message to said user equipment.

4. A radio basestation as claimed in claim 1, further comprising circuitry configured for locking said radio basestation in response to counting a predetermined number of connection establishment requests being received.

5. A radio basestation as claimed in claim 1, wherein said circuitry configured for redirecting is further configured for broadcasting system information to the user equipments, said system information comprising an instruction to the user equipments to redirect to another radio basestation or another RAT.

6. A radio basestation as claimed in claim 5, said instruction comprising a list of cells to which the user equipments can redirect.

7. A radio basestation as claimed in claim 5, said instruction instructing the user equipments to redirect to another radio basestation or RAT in response to lapse of a first period of time.

8. A radio basestation as claimed in claim 7, wherein said first period of time is randomly determined.

9. A radio basestation for serving one or more cells of a telecommunications network, the telecommunications network comprising a core network and a radio access network, the radio basestation comprising:
   one or more interface circuits configured for linking the radio basestation with the core network;
   circuitry configured for redirecting user equipments to another radio basestation or another radio access technology (RAT) in response to each of said one or more interface circuits becoming non-operational;
   timer circuit configured for locking said radio basestation in response to lapse of a period of time such that the radio basestation continues to redirect user equipments for said period of time after the last one of the interface circuit has become non-operational.

10. A radio basestation as claimed in claim 9, wherein the timer circuit is further configured such that the period of time is different to that of another basestation.

11. A radio basestation as claimed in claim 9, wherein the timer circuit is further configured such that the period of time is randomly determined by the timer circuit.

12. A radio basestation as claimed in claim 1, wherein said interface circuits are S1 interfaces.

13. A method in a radio basestation of a telecommunications network, the telecommunications network comprising a radio access network and a core network, the method comprising:
   in response to each of one or more interfaces between the radio basestation and the core network becoming non-operational, redirecting user equipments to another radio basestation or another radio access technology (RAT);
   receiving a connection establishment request from a user equipment, wherein said redirecting said user equipment to another radio basestation or radio access technology is responsive to said receipt of said connection establishment request; and counting a number of connection establishment requests received when each of said one or more interface circuits is non-operational.

14. A method as claimed in claim 13, wherein said redirecting user equipments to another radio basestation comprises redirecting user equipments to a cell of another radio basestation.

15. A method as claimed in claim 13, further comprising:
receiving a connection establishment request from a user equipment; and
redirecting said user equipment to another radio basestation or radio access technology upon receipt of said connection establishment request.

16. A method as claimed in claim 15, further comprising:
redirecting said user equipment to another radio basestation or another RAT by sending an adapted RRC Connection Reject message.

17. A method as claimed in claim 13, further comprising:
broadcasting system information to the user equipments, said system information comprising an instruction to the user equipments to redirect to another radio basestation or another RAT.

18. A method as claimed in claim 13, further comprising:
locking said radio basestation in response to counting a predetermined number of connection establishment requests being received.

19. A method in a radio basestation of a telecommunications network, the telecommunications network comprising a radio access network and a core network, the method comprising:

in response to each of one or more interfaces between the radio basestation and the core network becoming non-operational, redirecting user equipments to another radio basestation or another radio access technology (RAT); and locking said radio basestation in response to lapse of a period of time such that the radio basestation continues to redirect user equipments for said period of time after the last one of the interface circuit has become non-operational.

20. A method as claimed in claim 19, further comprising randomly determining the period of time.

* * * * *

UNITED STATES PATENT AND TRADEMARK OFFICE
CERTIFICATE OF CORRECTION

PATENT NO.       : 8,346,242 B2
APPLICATION NO.  : 13/121676
DATED            : January 1, 2013
INVENTOR(S)      : Westroos et al.

It is certified that error appears in the above-identified patent and that said Letters Patent is hereby corrected as shown below:

In the Specifications:

In Column 1, Line 55, delete "(MMES)" and insert -- (MMEs) --, therefor.

Signed and Sealed this
Sixteenth Day of April, 2013

Teresa Stanek Rea
*Acting Director of the United States Patent and Trademark Office*